UNITED STATES PATENT OFFICE.

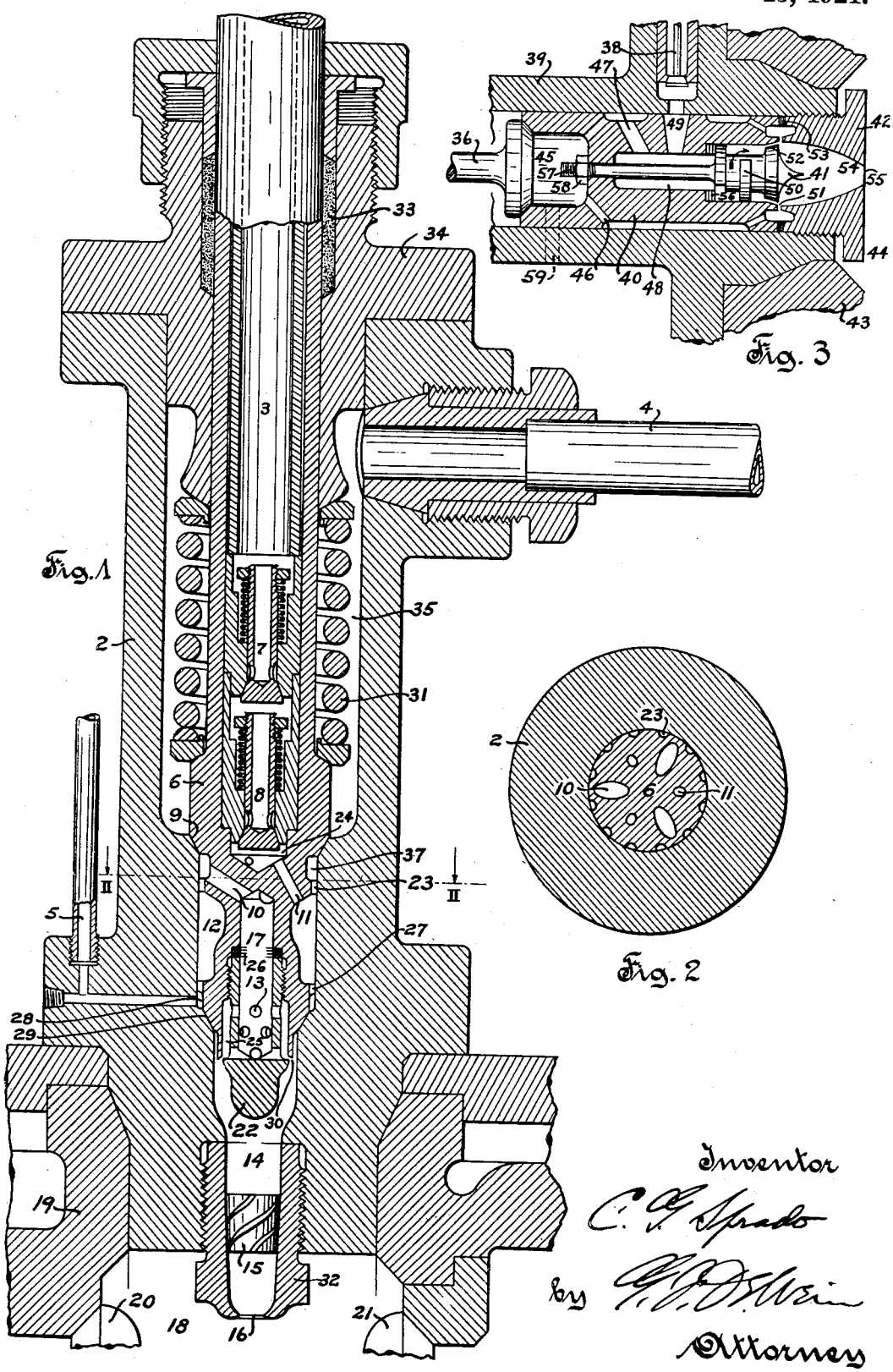

CARL G. SPRADO, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

INTERNAL-COMBUSTION ENGINE.

1,400,328.     Specification of Letters Patent.     Patented Dec. 13, 1921.

Application filed November 14, 1918. Serial No. 262,602.

*To all whom it may concern:*

Be it known that I, CARL G. SPRADO, a citizen of the United States, residing at Milwaukee, in the county of Milwaukee and State of Wisconsin, has invented a certain new and useful Improvement in Internal-Combustion Engines, of which the following is a specification.

This invention relates in general to improvements in the construction and operation of internal combustion engines and relates specifically to improvements in the construction of the fuel admission and charge forming mechanisms of such engines.

An object of the invention is to provide an internal combustion engine which is simple in construction and efficient in operation. Another object is to provide a compact and readily accessible construction of fuel and injection air inlet valve for internal combustion engines. A further object is to provide means for effectively atomizing fluent fuels prior to their ignition or combustion within the engine. Still another object is to provide efficient means for proportioning the fuel and air admitted in the charges. These and other objects and advantages will be apparent from the following description.

The present invention consists primarily in the provision of a fuel well which is constantly in open communication with the interior of the engine cylinder, devices for admitting a quantity of fluent fuel to the well, means for preventing the flow of fuel admitted to the well to the cylinder until a predetermined time, and devices for admitting injection air in parallel directly to the cylinder and through the well to force the fluent fuel therefrom and into the cylinder. The delivery of fuel from the well is effected through a restricted orifice, the direct delivery of air to the cylinder also being effected through a restricted orifice adapted to deliver a high velocity jet of air directly against the jet of fluent fuel delivered from the well. This impingement of the high jet of air against the fuel jet produces efficient atomization of the fuel thereby increasing the efficiency of the engine by permitting complete combustion of the charges. The invention is applicable to both vertical and horizontal types of engines and is not limited to the use of any particular kind of oil as a fuel.

A clear conception of several embodiments of the invention and of the operation of the device may be had by referring to the drawing accompanying and forming a part of this specification, in which like reference characters designate the same or similar parts in the various views.

Figure 1 is a transverse vertical section through the fuel injection and charge forming mechanism of a vertical internal combustion engine, showing the same applied to a fragment of an engine cylinder.

Fig. 2 is a transverse horizontal section through the fuel injection and charge forming mechanism, the section being taken along the line II—II of Fig. 1 looking in the direction of the arrows.

Fig. 3 is a transverse vertical section through the fuel injection and charge forming mechanism of a horizontal internal combustion engine, showing the same applied to a fragment of an engine cylinder.

Referring specifically to Figs. 1 and 2, which embodiment is especially adapted to vertical engines, the vertical fuel injection casing 2 is provided with a central through passage having vertically spaced seatings 9, 29 therein, with which a vertically reciprocable injection air inlet valve 6 is adapted to coact. The casing 2 is fitted at its lower extremity into a bore in the end of the engine cylinder 19 and has a head 34 closing the upper extremity thereof. The cylinder 19 is provided with the usual inlet and exhaust valves 20, 21 through which air is delivered to and exhaust gases are discharged from the combustion chamber 18 of the engine.

The vertical injection air inlet valve 6 which is located within the through passage of the casing 2, has an internal bore 3 in the lower portion of which are located oil inlet valves 7, 8 and through the upper portion of which oil is delivered to these inlet valves. A packing 33 is provided at the point of penetration of the head 34 by the stem of the air injection valve 6, this packing preventing escape of gases to the atmosphere. Within the casing 2 and surrounding the upper portion of the air injection valve 6 is an annular air supply chamber 35 to which injection air under pressure is admitted through an air inlet pipe 4. The valve 6 is urged against the upper and lower seatings 9, 29 by means of a helical compression spring 31 coacting at its lower end with a shoulder formed on the valve 6 and at its upper end with an abutment formed on the head 34. The actuation of the injection air inlet valve 6 and the oil inlet valves 7, 8 is effected in a manner similar to that described in Patent No. 1,279,775 granted September 24, 1918, and has been omitted from the present disclosure in order to simplify the same.

Below the upper seating 9 of the valve 6 and above the lower seating 29, is located an annular oil well 12 surrounding the lower end of the valve 6. This oil well 12 communicates with a chamber 24 below the lower oil injection valve 8 through a series of ports or passages 11. An auxiliary oil inlet conduit 5 communicates with an annular chamber 28 located directly above the seating 29 and communicating with the main oil well 12 through a series of restricted passages 27. The oil well 12 also communicates with an annular chamber 37 located above the well and directly below the seating 9, through a series of restricted passages 23. The annular chamber 37 communicates with a central air chamber 17 formed partially within the valve 6 and partially within an adjustable center 22, by means of a series of ports or passages 10. The adjustable center 22 is vertically adjustable relatively to the valve 6 and is fixedly located in adjusted position by means of shims 26. The center 22 has a series of radial air ports 13 which provide means of communication between the central chamber 17 and an annular air distributing chamber 25. The air distributing chamber 25 communicates with the mixing chamber 14 formed in the casing 2, through an annular restricted orifice 30. The mixing chamber 14 communicates directly with the combustion chamber 18 of the engine, through a spray device 15 and an orifice 16 formed in the discharge nozzle 32. The chamber 14 is at all times in open communication with the combustion chamber 18 thereby constantly maintaining communication between the oil well 12, the chamber 37 and the combustion chamber 18, through the passages 10, chamber 17, ports 13, chamber 25, orifice 30 and mixing chamber 14.

Referring specifically to Fig. 3 which embodiment is especially adapted to horizontal engines, the horizontal fuel injection casing 39 is provided with a central through passage having a stationary element 40 fixedly located therein by any suitable means such as locking pins 59. The element 40 has an air distributing chamber 45 formed in one end thereof to which air under pressure is admitted past an injection air valve 36. An adjustable core 41 having a rearwardly extending clamping rod 57 is fixedly located within the element 40 by means of a nut 58 coacting with the rod 57. Adjacent the end of the core 41 and between this core and the element 40 is an annular oil discharge orifice 52 the area of which may be varied by inserting more or less shims 56 between an abutment formed on the element 41 and an adjacent surface of the element 40. The core 41 is provided with a flange 50 forming a dam for the forward end of an oil well 48 formed within the element 40. Oil is admitted to the oil well 48 past an oil inlet valve 38 and through a passage 49. As in the embodiment of Figs. 1 and 2, the actuation of the injection air inlet valve 36 and of the oil inlet valve 38 is effected in a manner similar to that described in the patent hereinabove referred to.

The air distributing chamber 45 communicates with an annular air chamber surrounding the element 40, through ports or passages 46. The upper portion of the annular air chamber surrounding the element 40, communicates with the upper portion of the oil well 48 through an open passage 47. The annular chamber surrounding the element 40 also communicates with an annular delivery chamber adjacent the corresponding ends of the core 41 and element 40, by means of a series of restricted air ports. The annular delivery chamber adjacent the ends of the core 41 and element 40, has an annular restricted orifice 51 adapted to direct a jet of air across the jet of oil delivered through the restricted orifice 52. The orifices 51, 52 communicate directly with the mixing chamber 54 formed in the adjustable head 42. The mixing chamber 54 communicates with the combustion chamber 44 of the engine through a discharge orifice 55. The area of the orifice 51 may be varied by inserting more or less shims 53 between the head 42 and the end of the element 40. The casing 39 has an end which fits a bore in the cylinder 43 either at the side or at the end of the cylinder. The chamber 54 is at all times in open communication with the combustion chamber 44 thereby constantly maintaining communication between the chamber 45, oil well 48 and the combustion chamber 44 through the various intercepting chambers, passages and ports.

During the normal operation of the device disclosed in Figs. 1 and 2, and assuming the engine to be operating with a relatively light oil as a fuel, oil is delivered to the oil well 12 from the conduit 3 past the valves 7, 8 and through the chamber 24 and passages 11. During such admission of oil the valve 6 is in engagement with the seatings 9, 29 and the oil is thus temporarily retained within the oil well 12. After sufficient oil has been admitted to constitute a charge, the air valve 6 is raised from its seatings and injection air under pressure is admitted from the air chamber 35 past the seating 9 to the annular air chamber 37. From this chamber 37 a portion of the compressed air flows directly to the mixing chamber 14 through the passages 10, chamber 17, ports 13, chamber 25 and orifice 30, this air upon being delivered from the orifice 30 assuming the form of a high velocity jet which is discharged against the adjacent wall or bore of the casing 2. Another portion of the air from the chamber 37 passes through the restricted passages 23 and is discharged against the upper surface of the oil in the well 12. The air thus admitted forces the oil from the well 12 and past the seating 29 in the form of a relatively thin annular film. As this film of oil passes the jet of air delivered from the orifice 30 it is thoroughly atomized and mixed with the air to form a spray of mixture. The atomized mixture passes through the chamber 14 and spray device 15 wherein any previously unatomized particles are thoroughly atomized, the final mixture being delivered to the combustion chamber through the orifice 16.

If the oil utilized for the operation of the engine is of relatively heavy quality, it may be desirable to utilize a small charge of comparatively light and highly flammable oil in advance of the regular charge. This priming oil may be admitted to the chamber 28 from the conduit 5 by means of a pump and precedes the heavy oil delivered from the well 12. The valves of the priming oil pump prevent reverse flow of fluid from the chamber 28 to the conduit 5.

During the normal operation of the device disclosed in Fig. 3, the oil is admitted to the oil well 48 past the oil inlet valve 38 and through the passage 49, assuming a level below the crest of the dam 50. After a sufficient quantity of oil has been admitted to the well to constitute a charge, compressed air is admitted to the chamber 45 past the valve 36. The compressed air thus admitted flows through the passages 46 into the annular chamber surrounding the element 40. A portion of the air thus admitted to the chamber surrounding the element 40, is delivered through the orifice 51 and forms a high velocity annular spray directed inwardly toward axis of the core 41. Another portion of the air admitted at the chamber surrounding the element 40 passes directly through the passage 47 into the oil well 48 and forces the oil from the well 48 along the core 41 over the dam 50 and through the orifice 52 to form an annular jet of oil. The jet of oil delivered from the orifice 52 strikes the jet of air delivered from the orifice 51 thus producing thorough atomization of the oil. The atomized mixture passes through the mixing chamber 54 and is delivered to the combustion chamber 44 of the engine through the orifice 55.

It will thus be noted that in each case the fuel well 12, 48 is constantly in open communication with the interior of the engine cylinder. The air is admitted from the chamber 37, 45 parallel directly to the engine cylinder and to the oil well. In each case atomization is accomplished by impingement of jets of oil and air against each other. The atomized mixture is delivered directly to the engine cylinder without necessity of passing valves or other obstructions which would tend to destroy the effectiveness of atomization. The oil and air delivery orifices are readily adjustable to vary the jet areas, by varying the number of shims.

It should be understood that it is not desired to limit the invention to the exact details of construction and operation herein shown and described, for various modifications may occur to persons skilled in the art.

It is claimed and desired to secure by Letters Patent:

1. In combination, an engine cylinder having a combustion zone, means providing a mixing chamber constantly communicating with said zone through a restricted orifice, means for restrictively admitting air directly to said chamber, an oil well, means for admitting oil to said well, and means for restrictively delivering oil from said well to said chamber past said air admission means.

2. In combination, an engine cylinder, an oil well in open communication with said cylinder, means for admitting oil to said well, means for normally preventing the flow of oil from said well to said cylinder, means for admitting air to said well to force oil from said well into said cylinder, and means for admitting air directly to said cylinder.

3. In combination, an engine cylinder having a combustion zone, means providing a mixing chamber constantly communicating with said zone through a restricted orifice, an oil well, means for admitting oil to said well, means for normally preventing the flow of oil from said well to said chamber, means for admitting air to said well to force oil from said well into said chamber, and means for admitting air directly to said chamber.

4. In combination, an engine cylinder, an oil well in open communication with said cylinder, means for admitting oil to said well, means for normally preventing the flow of oil from said well to said cylinder, means for restrictively admitting air to said cylinder, and means for restrictively delivering oil from said well to said cylinder past said air admission means.

5. In combination, an engine cylinder, an oil well in open communication with said cylinder, means for admitting oil to said well, means for normally preventing the flow of oil from said well to said cylinder, and means for simultaneously admitting air in parallel directly to said cylinder and to said well to force oil into said cylinder.

6. In combination, an engine cylinder having a combustion zone, means providing a mixing chamber constantly communicating with said zone through a restricted orifice, an oil well, means for admitting oil to said well, means for normally preventing the flow of oil from said well to said chamber, and means for simultaneously admitting air in parallel to said chamber and to said well to force oil into said chamber.

7. In combination, an engine cylinder, means for admitting air directly to said cylinder, an oil well in open communication with said cylinder, means for normally preventing the flow of oil from said well to said cylinder, means for admitting oil to said well, and means for admitting air to said well and for simultaneously establishing flow-permitting communication between said well and said cylinder.

8. In combination, an engine cylinder, means providing a mixing chamber constantly communicating with said cylinder through a restricted orifice, means for admitting air directly to said chamber, an oil well, means for normally preventing the flow of oil from said well to said chamber, means for admitting oil to said well, and means for admitting air to said well and for simultaneously establishing flow-permitting communication between said well and said chamber.

9. In combination, an engine cylinder, an oil well in open communication with said cylinder, means for normally preventing the flow of oil from said well to said cylinder, means for admitting oil to said well, and means for admitting air in parallel directly to said cylinder and to said well and for simultaneously establishing flow-permitting communication between said well and said cylinder.

10. In combination, an engine cylinder, means providing a mixing chamber constantly communicating with said cylinder through a restricted orifice, an oil well, means for normally preventing the flow of oil from said well to said chamber, means for admitting oil to said well, and means for admitting air in parallel directly to said chamber and to said well and for simultaneously establishing flow-permitting communication between said well and said chamber.

In testimony whereof, the signature of the inventor is affixed hereto.

CARL G. SPRADO.